United States Patent Office 3,808,114
Patented Apr. 30, 1974

3,808,114
LIGHT-CURABLE POLYGLYCIDYL ESTER COMPOSITIONS
Toyoji Tsuchihara and Toshiaki Takahashi, Yokohama, and Yoshibumi Ishii, Tomonori Ando, and Eiichiro Takiyama, Tokyo, Japan, assignors to Showa High Polymer Co., Ltd., and Showa Denko Kabushiki Kaisha, both of Tokyo, Japan
No Drawing. Filed Sept. 8, 1971, Ser. No. 178,785
Claims priority, application Japan, Sept. 14, 1970, 45/79,948
Int. Cl. B01j 1/10, 1/12
U.S. Cl. 204—159.16      3 Claims

ABSTRACT OF THE DISCLOSURE

A light-curable resinous composition comprises a major amount of unsaturated hydroxy-containing ester type polyester and an effective amount of a light sensitizer and optionally a suitable amount of a copolymerizable monomer. The unsaturated hydroxy-containing ester type polyester is produced by reacting an organic polybasic acid-polyglycidylester having one or more epoxy groups in the molecule with an unsaturated monobasic acid under heating by using an esterification catalyst in the presence of a polymerization inhibitor. It is noted that the unsaturated hydroxy-containing ester type polyester is modified by replacing a part of the unsaturated monobasic acid with at least one member selected from the group consisting of saturated monobasic acids, saturated polybasic acids, anhydrides thereof, unsaturated polybasic acids, anhydrides thereof, saturated alkyds having terminal carboxyl groups and unsaturated alkyds having terminal carboxyl groups.

DETAILED EXPLANATION OF THE INVENTION

This invention relates to a light-curable resinous composition comprising an unsaturated hydroxy-containing ester type polyester and a light sensitizer.

Heretofore, certain unsaturated hydroxy-containing ether type polyesters were developed and they were produced by reacting a certain epoxy compound such as a polyglycidyl ether of a polyhydric phenol with certain unsaturated monobasic acids in the presence or the absence of at least one member selected from the group consisting of saturated polybasic acids, anhydrides thereof, unsaturated polybasic acids and anhydrides thereof under heating by using an esterification catalyst in the presence or the absence of a polymerization inhibitor, a solvent and a copolymerizable monomer as disclosed in Japanese patent application Nos. 429/65, 9,399/66 and 51,028/66. The unsaturated hydroxy-containing ether type polyesters thus produced can be cured under heating or at room temperature by using an organic peroxide as a curing agent in the presence or the absence of a metal salt as a promotor and they are useful in making paints, glass fiber-reinforced plastics, cast articles and adhesives.

In general, curability of an epoxy resin can hardly be controlled by keeping the temperature constant because the amount of the curing agent is limited in a narrow range and therefore it is usual that the curability of the epoxy resin is controlled by adjusting the temperature. Thus, when the epoxy resin is cured at room temperature, difficulties are encountered in the operation so that it is cured rapidly in the summer time but not cured in the winter time. On the contrary, curability of the unsaturated hydroxy-containing ether type polyester can be controlled by using the organic peroxides and the promoters in an amount within the wide range at the same level even if it is used in the summer time and the winter time.

From a viewpoint of an ideal, it is desirable that the epoxy resin or the unsaturated hydroxy-containing ether type polyester has as long a pot life as possible after it is mixed with the curing agent but also that it is cured at a short period of time as possible when it is used practically. It is, however, usual that the epoxy resin or the unsaturated hydroxy-containing ether type polyester has a short pot life after it is mixed with the curing agent and the promoter and thus the user feels uneasy when it is used.

In order to remove the above mentioned disadvantages adherent to the epoxy resin and the unsaturated hydroxy-containing ether type polyester, the inventors have developed an unsaturated hydroxy-containing ester type polyester which is cured under irradiation of the visible ray or ultraviolet rays to produce a product which is improved in hardness, chemical resistance and mechanical strength.

Therefore, an object of this invention is to provide a light-curable resinous composition comprising the light-curable unsaturated hydroxy-containing ester type polyester and a light sensitizer.

A further object of this invention is to provide a light-curable resinous composition comprising the light-curable unsaturated hydroxy-containing ester type polyester, a light sensitizer and a copolymerizable monomer.

The light-curable resinous composition of this invention can be cured under irradiation of the visible ray or the ultraviolet rays because the light sensitizer is decomposed to liberate a radical for inducing the polymerization reaction of the light-curable unsaturated hydroxy-containing ester type polyester. Therefore, it is noted that the light-curable unsaturated hydroxy-containing ester type polyester used in this invention does not require use of the organic peroxides as the curing agent but requires use of light to cure. Thus, the light-curable resinous composition of this invention has the long pot life so far as it is stored in a dark place and so the user has no care about the short pot life of the unsaturated hydroxy-containing ether type polyester after it is mixed with the curing agent. Also it is noted that the light-curable resinous composition of this invention can be used as it is without mixing a liquid containing the curing agent and so it can easily be used in practice by the user. Still further it is noted that the escape of the copolymerizable monomer contained in the light-curable resinous composition can be prevented because the polymerization reaction is initiated on the surface of a shaped member and so the quality of the cured resin is not degraded. Thus the light-curable resinous composition of this invention can be used for manufacturing paints, printing members, recopying members, displaying members, reinforced plastics and the like.

In order to achieve the above mentioned objects of this invention, the light-curable resinous composition comprises 100 parts of the light curable unsaturated hydroxy-containing ester type polyester and more than 0.01 part of the light sensitizer.

The unsaturated hydroxy-containing ester type polyester used in this invention can be produced by reacting an organic polybasic acid-polyglycidylester having one or more epoxy groups in the molecule with an unsaturated monobasic acid under heating by using an esterification catalyst in the presence of a polymerization inhibitor.

It is noted that a part of the unsaturated monobasic acid may be replaced with at least one member selected from the group consisting of saturated monobasic acids, saturated polybasic acids, anhydrides thereof, unsaturated polybasic acids, anhydrides thereof, saturated alkyds having terminal carboxyl groups and unsaturated alkyds having terminal carboxyl groups in an amount not damaging the grade of the resultant unsaturated hydroxy-containing ester type polyester.

The unsaturated hydroxy-containing ester type polyester may be mixed with a solvent or a copolymerizable monomer in an amount required for controlling its curability, workability and quality. Also it is noted in producing the hydroxy-containing ester type polyester that a mol ratio of the carboxyl group of the unsaturated monobasic acid or the total carboxyl groups of the unsaturated monobasic acid plus the other acid components to the epoxy group of the organic polybasic acid-polyglycidylester may be varied above 0.1, and it is preferable to use 0.2 to 1.5 moles and also more preferable to use 0.8 to 1.5 mols of the carboxyl groups or the total carboxyl groups per mole of the epoxy group in considering the curability and quality of the resultant unsaturated hydroxy-containing ester type polyester.

Further, it is noted that the organic polybasic acid-polyglycidylester having one or more epoxy groups in the molecule is synthetized by reacting the saturated or unsaturated polybasic acid with epichlorhydrin or methyl epichlorhydrin.

Still further, it is noted that the saturated alkyds having the terminal carboxyl groups can be synthesized by reacting a polyhydric alcohol with the saturated polybasic acid which is used in a mole ratio of above 1 per mole of the polyhydric alcohol, and also that the unsaturated alkyds having the terminal carboxyl groups can be syntesized by reacting the polyhydric alcohol with the unsaturated polybasic acid or its anhydride which is used in a mole ratio of above 1 per mole of the polyhydric alcohol. In such a case, a part of the unsaturated polybasic acid or its anhydride may be replaced with the saturated polybasic acid or its anhydride.

Examples of the unsaturated monobasic acids used in this invention are acrylic acid, methacrylic acid, sorbic acid and others having a polymerizable or copolymerizable unsaturation in the molecule. Also, certain monoesters of the unsaturated polybasic acids may be used in an amount not damaging the characteristics of the light curable resinous composition of this invention.

Examples of the saturated monobasic acids, saturated polybasic acids, unsaturated polybasic acids and their anhydrides used in this invention are acetic acid, benzoic acid, maleic acid, maleic acid anhydride, fumaric acid, citraconic acid, itaconic acid, tetrachlorophthalic acid anhydride, Het acid, tetrabromophthalic acid anhydride, phthalic acid, isophthalic acid, terephthalic acid, endomethylene tetrahydrophthalic acid anhydride, tetrahydrophtalic acid anydride, hexahydrophthalic acid, succinic acid, adipic acid, azelaic acid, sebacic acid, an adduct of anthracene and maleic acid anhydride, an adduct or rosin and maleic acid anhydride, glutaric acid, an adduct of cyclopentadiene and unsaturated carboxylic acid, trimellitic acid anhydride, pyromellitic acid anhydride and the like.

Examples of polyhydric alcohol used in this invention are ethylene glycol, glycerine, propylene glycol, diethylene glycol, dipropylene diprophylene glycol, triethylene glycol, trimethylene glycol, butane-diol-1,4, -1,3 and -2,3, pentane-diol-1,5, hexane-diol-1,6, neopentyl glycol and the like.

The esterification catalyst used in this invention includes n-butylamine, dimethylamine, triethylamine, diethylamine hydrochloride, tetramethylammonium chloride, tetramethylammonium chloride, triphenylsulphonium chloride, triphenylmethyl phosphonium iodide, boron trichloride, trifluoroboron-monoethylamine, lithium chloride, butyltitanate, triphenylphosphine, triphenyl antimonate and the like.

The polymerization inhibitor is used for preventing the gel formation of the reaction product and it includes hydroquinone, p-tertiary butylcatechol, methoxy-hydroquinone, benzoquinone, copper salts and the like.

In accordance with this invention, the unsaturated hydroxy-containing ester type polyester may be used in combination with a copolymerizable monomer such as styrene, vinyl toluene, acrylic acid, methyl ester of acrylic acid, ethyl ester of acrylic acid, methacrylic acid, methyl ester of methacrylic acid, ethyl ester of methacrylic acid, acrylonitrile, methacrylonitrile or divinylbenzene or mixtures thereof for controlling the viscosity of the unsaturated hydroxy-containing ester type polyester but it is noted that the copolymerizable monomer is not an essential component of the light curable resinous composition of this invention because the unsaturated hydroxy-containing ester type polyester can be polymerized by itself under irradiation of the visible ray or the ultraviolet rays. This is the characteristic of the unsaturated hydroxy-containing ester type polyester which is different from an unsaturated polyester resin.

Also the unsaturated hydroxy-containing ester type polyester may be synthesized in the presence of an organic solvent or it may be used in combination with the organic solvent. The organic solvent used includes benzene, ethyl alcohol, dipropyl ketone, ethyl acetate, acetyl acetone, butyl lactate and the like.

Examples of the light sensitizers used in this invention are carbonyl compounds such as 2,3-hexadione, diacetyl, acetophenone, benzoin, benzoin-methyl ether, benzoin-isopropyl ether, benzoyl acetone, benzophenone, phenanthrenequinone and ascorbic acid; nitrogen-containing compounds such as diazomethane, azo-bis-isobutyronitrile, hydrazine, phenyl hydrazine, phenyl hydrazine hydrochloride and trimethylbenzylammonium chloride; sulphur-containing compounds such as benzene sulfonate, diphenyl-disulfide, thiourea, mercapto-benzthiazol and tetramethyl-thiuram-disulfide; dyestuffs such as methylene blue-eosine and toluidine blue-O; and phosphorus-containing compounds such as triphenylphosphine and the like. Such light sensitizers are used alone or in combination each other.

In accordance with this invention, the light curable resinous composition comprises 100 parts of the unsaturated hydroxy-containing ester type polyester and more than 0.01 part of the light sensitizer and it is preferably to use 0.1 to 3 parts of the light sensitizer per 100 parts of said ester type polyester. If it is desired, fillers, pigments and dyestuffs may be incorporated with the light curable resinous composition.

The unsaturated hydroxy-containing ester type polyester used in this invention has not only an advantageous low viscosity in comparison with that of the so-called glycidylether type polyester which is produced by reacting a bis-phenol compound or novolak with epichlorohydrine but also the former has improved resistance against weathering. Therefore the unsaturated hydroxy-containing ester type polyester displays remarkable actions and effects when a paint is made of the light curable resinous composition of this invention and the paint is used in the open air. It is noted that the light curable resinous composition can easily be cured under irradiation of the rays emitted from a mercury lamp, an ultraviolet fluorescent lamp, a carbon-arc lamp and a xenon lamp after it is coated on the intended objects or it is cast into the shaped articles. Also, it is noted that the light curable resinous composition can be cured in the open air by the action of sunlight when it is fine weather.

This invention is illustrated by the following examples.

Example 1

1750 grams of diglycidylester of phthalic acid, 860 grams of methacrylic acid, 8.5 grams of benzyldimethylamine and 0.5 gram of hydroquinone were charged in a 5 liter flask equipped with a stirrer, a thermometer, an inlet glass tube and a reflux condener and the flask was placed on an oil bath which was kept at 130° C. and a chemical reaction was carried out for 2 to 2.5 hours thereby to produce an unsaturated hydroxy-containing ester type polyester having an acid value of below 10. Test samples 1, 2 and 3 were prepared by mixing 100 parts of the unsaturated hydroxy-containing ester type polyester with one part of benzoin-methylether, a copolymerizable monomer and a solvent in the amount as indicated in the following Table 1. Each of the three test samples was coated on a glass plate by using a knife coater to form a film having a 0.2 millimeter thickness. The film was irradiated for five minutes by the ray emitted from a 400 watt mercury lamp which was placed at the distance of 10 centimeters from the film. Then, the film was tested for pencil hardness and it was found that all the test samples were fully cured and that the film has good pencil hardness. The test results are given in the following Tabe 1.

TABLE 1

| No. of test Sample | Solvents or monomers | Tackiness of the surface | Pencil hardness |
| --- | --- | --- | --- |
| 1 | Methylmethacrylate (30%) | Non-tacky | 3H |
| 2 | Styrene (30%) | do | 4H |
| 3 | Ethyl acetate (30%) | do | 4H |

Example 2

1800 grams of diglycidylester of hexahydrophthalic acid, 154 grams of hexahydrophthalic acid anhydride, 570 grams of acrylic acid, 8 grams of dimethylamine hydrochloride and 0.5 gram of hydroquinone were charged in the same flask as indicated in Example 1 and the contents of the flask were heated with agitation at 125 to 130° C. for 5 to 6 hours in a current air stream thereby to produce a first reaction product having the acid value of 18.7. The first reaction product was mixed with 200 grams of styrene and the mixture was heated for 1 to 2 hours thereby to produce a second reaction product having an acid value of below 10. The second reaction product was mixed with 1000 grams of styrene to produce an unsaturated hydroxy-containing ester type polyester.

A light curable resinous composition was prepared by mixing 100 parts of the unsaturated hydroxy-containing ester type polyester with one part of diphenyldisulfide. The light curable resinous composition was poured into a beaker having a size of 4 centimeters in the inner diameter until said composition reaches 10 millimeters in depth. The light curable resinous composition contained in the beaker was irradiated for 30 minutes by using a 400 watt mercury lamp which was placed at the distance of 10 centimeters from the beaker. It was found that the light curable resinous composition is converted into a yellowish brown hardened resin having the surface pencil hardness of 3H to 4H.

Example 3

A comparative unsaturated hydroxy-containing ether type polyester was prepared by using a bis-phenol diglycidylether type epoxy compound which is sold under the trade name of Epikote 1001 having the molecular weight of 900, a melting point of 64° C. to 74° C. and the epoxy values of 450 to 500.

Namely, 1000 grams of Epikote 1001, 145 grams of acrylic acid, 3 grams of diethylamine hydrochloride and 0.3 gram of hydroquinone were charged in a 3 liter flask equipped with a stirrer, a thermometer, an inlet glass tube and a reflux condenser and the contents of the flask were heated with agitation at 120° C. to 135° C. for 3 hours to produce a viscous reaction product. The reaction product was mixed with 200 grams of styrene and the mixture was heated for an additional one hour to produce a final reaction product having an acid value of about 10. In this example, the final reaction product is termed the comparative unsaturated epoxy-ester resin.

Two kinds of paints were prepared by using the unsaturated hydroxy-containing ester type polyester as shown in Example 1 and the comparative unsaturated hydroxy-containing ether type polyester. Namely, one gram of benzoin was dissolved in 100 parts of the former resin under heating, and 0.3 part of phthalocyanine green and 3 parts of aerosil were added thereto and then the resultant mixture was kneaded by using three rollers to produce a paint which is referred to as the paint (A). In the same manner, one gram of benzoin was dissolved in 100 parts of the latter resin, and 0.3 part of phthalocyanine green and 3 parts of aerosil were added thereto and then the resultant mixture was kneaded to produce a paint which is referred to as the paint (B). The paints (A) and (B) were coated respectively on a slate to form a film (1) and a film (2) having a 0.2 millimeter thickness respectively. The films (1) and (2) were irradiated for 3 minutes by using a 400 watt mercury lamp which was placed at the distance of 10 centimeters from the films. The films (1) and (2) were tested for their pencil hardness and light-reflectivity. It was found that they are essentially the same in their light-reflectivity and have a 85 to 87% light-reflectivity. Also, the films were subjected to a weathering test for 200 hours by using a weatheometer and then the weathered films were tested for their brightness and light-reflectivity. The test results are given in the following Table 2.

TABLE 2

| No. of film | Pencil hardness | Light-reflectivity (percent) and brightness |
| --- | --- | --- |
| 1 | 4H | 76% glossy. |
| 2 | 2H | 11% lusterless. |

Example 4

A mixture of one equivalent of ethyleneglycol, two equivalents of diethyleneglycol and four equivalents of methyltetrahydrophthalic acid anhydride was heated at 180° C. to 185° C. for six hours in the presence of carbon dioxide gas to produce an unsaturated alkyd having an acid value of 118. Two equivalents of the unsaturated alkyd, four equivalents of diglycidylphthalate and two equivalents of acrylic acid were charged in a reaction vessel and then the content of the reaction vessel was mixed with styrene until the concentration of styrene reached 10%. 100 parts of the resultant mixture were mixed with 0.3 part of triethylamine and 0.04 part of hydroquinone and then the mixture was heated at 120° C. for 200 minutes until the acid value of the unsaturated alkyd was reduced to 12. The reaction product was cooled to 80° C. and then it was mixed with an additional amount of styrene until the concentration of styrene reached 35% and then the mixture was mixed with one part of benzoin-methylether for producing a light curable resinous composition. It was found that the light curable resinous composition has a gel-time of 55 to 62 seconds and a pencil hardness of 2H and also that the light curable resinous composition is finally cured when it is irradiated for 180 minutes by using a mercury lamp.

What we claim is that:

1. A light-curable resinous composition comprising 100 parts of an unsaturated hydroxy-containing ester type polyester and 0.01-3 parts of a light sensitizer, the polyester being produced by reacting an organic polybasic acid-polyglycidylester having 2 or 3 epoxy groups with an unsaturated mono-basic acid and at least one member selected from the group consisting of saturated alkyds and unsaturated alkyds having terminal carboxyl groups, in an amount of 0.8–1.5 moles of carboxyl group per mole of epoxy group, at a temperature of 120–130° C. for 2–6 hours using an esterification catalyst in the presence of a polymerization inhibitor.

2. A light-curable resinous composition comprising 100 parts of an unsaturated hydroxy-containing ester type polyester and 0.01–3 parts of a light sensitizer, the polyester being produced by reacting an organic polybasic acid-polyglycidylester having 2 or 3 epoxy groups with an unsaturated monobasic acid and at least one member selected from the group consisting of saturated alkyds and unsaturated alkyds having terminal carboxyl groups, in an amount of 0.8–1.5 moles of carboxyl group per mole of epoxy group, at a temperature of 120–130° C. for 2–6 hours using an esterification catalyst in the presence of a copolymerizable monomer and a polymerization inhibitor.

3. A light-curable resinous composition comprising 100 parts of an unsaturated hydroxy-containing ester type polyester, 0.01–3 parts of a light sensitizer and a compolymerizable monomer, the polyester being produced by reacting an organic polybasic acid-polyglycidylester having 2 or 3 epoxy groups with an unsaturated monobasic acid and at least one member selected from the group consisting of saturated alkyds and unsaturated alkyds having terminal carboxyl groups, in an amount of 0.8–1.5 moles of carboxyl group per mole of epoxy group, at a temperature of 120–130° C. for 2–6 hours using an esterification catalyst in the presence of a polymerization inhibitor.

References Cited
UNITED STATES PATENTS

| | | | |
|---|---|---|---|
| 3,377,406 | 4/1968 | Newey et al. | 260—836 |
| 3,450,613 | 6/1969 | Steinberg | 204—159.15 |
| 3,535,403 | 10/1970 | Holub et al. | 260—837 R |
| 3,558,387 | 1/1971 | Bassemir et al. | 260—837 R |
| 3,677,920 | 7/1972 | Kai et al. | 204—159.15 |

JOHN C. BLEUTGE, Primary Examiner

R. B. TURER, Assistant Examiner

U.S. Cl. X.R.

204— 159.15, 159.18, 159.19; 260—835, 836